(12) United States Patent
Lacambra

(10) Patent No.: US 10,107,439 B2
(45) Date of Patent: Oct. 23, 2018

(54) CONTAINMENT DEVICE FOR WORK CARRIED OUT ON A PIPE, AND ASSOCIATED METHOD

(71) Applicant: SOLETANCHE FREYSSINET, Rueil Malmaison (FR)

(72) Inventor: Germinal Lacambra, Jouques (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 216 days.

(21) Appl. No.: 14/911,880

(22) PCT Filed: Aug. 11, 2014

(86) PCT No.: PCT/FR2014/052078
§ 371 (c)(1),
(2) Date: Feb. 12, 2016

(87) PCT Pub. No.: WO2015/022467
PCT Pub. Date: Feb. 19, 2015

(65) Prior Publication Data
US 2016/0201840 A1    Jul. 14, 2016

(30) Foreign Application Priority Data

Aug. 12, 2013 (FR) ..................... 13 57964

(51) Int. Cl.
*F16L 55/16* (2006.01)
*F16L 55/18* (2006.01)
*F16L 41/06* (2006.01)

(52) U.S. Cl.
CPC ............. *F16L 55/18* (2013.01); *F16L 41/065* (2013.01)

(58) Field of Classification Search
CPC ................................ F16L 55/18; F16L 41/065
USPC ....................................................... 138/97, 99
See application file for complete search history.

(56) References Cited

U.S. PATENT DOCUMENTS 2,812,641 A * 11/1957 Elliott ................. B63B 17/0018
                                                        138/97
2,899,983 A *  8/1959 Farris .................... F16L 55/124
                                                        137/318
2,984,129 A *  5/1961 Allen ....................... F16L 55/10
                                                        137/318

(Continued)

FOREIGN PATENT DOCUMENTS

BE    1 011 257 A6    6/1999
GB    2 093 146 A     8/1982

*Primary Examiner* — James Hook
(74) *Attorney, Agent, or Firm* — Dentons US LLP

(57) ABSTRACT

The invention relates to the field of operations of cutting and isolating pipes that may contain a product that is hazardous to the environment or the personnel carrying out work and requires leak tight handling. The invention relates more particularly to a containment device 1 for work carried out on a pipe comprising a rigid tool flange 11 having an end wall provided with an orifice with a section adapted to the external cross of the pipe, an opening wider than the orifice located opposite the end wall, and a side access 111 for a cutting tool, and a flexible film 13 for forming a leak tight volume around the pipe, wherein a first film end that is fixed to the opening in teh tool flange mounted on the pipe and a second film end that is connected to the pipe. The invention also relates to a method for cutting and isolating a pipe.

10 Claims, 9 Drawing Sheets

(56) References Cited

U.S. PATENT DOCUMENTS

| | | | |
|---|---|---|---|
| 3,051,164 A * | 8/1962 | Trexler | A61G 10/005 119/417 |
| 3,650,547 A * | 3/1972 | Tickett | F16L 25/028 137/318 |
| 3,652,107 A * | 3/1972 | Tickett | F16L 21/06 137/318 |
| 3,703,906 A * | 11/1972 | Tickett | F16K 3/22 137/15.09 |
| 3,735,775 A * | 5/1973 | Tickett | F16L 41/06 137/318 |
| 4,242,164 A | 12/1980 | Skinner | |
| 4,335,712 A * | 6/1982 | Trexler | A61G 10/005 128/205.26 |
| 4,812,700 A * | 3/1989 | Natale | B08B 9/023 134/21 |
| 5,483,990 A * | 1/1996 | Martin | F16L 41/06 137/318 |
| 2004/0227347 A1 | 11/2004 | Fundin et al. | |

* cited by examiner

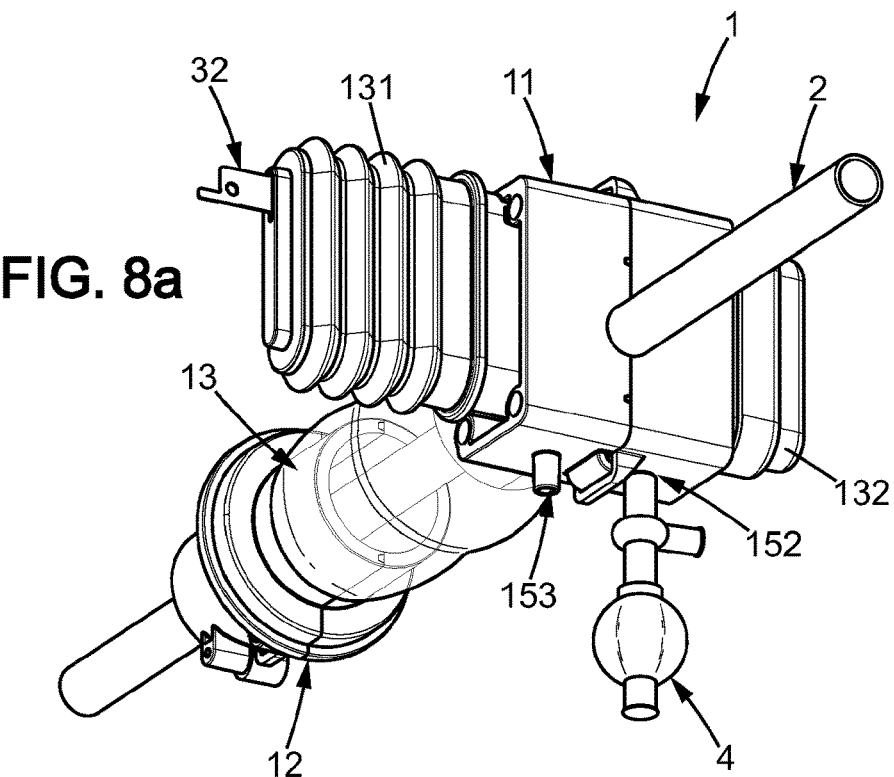
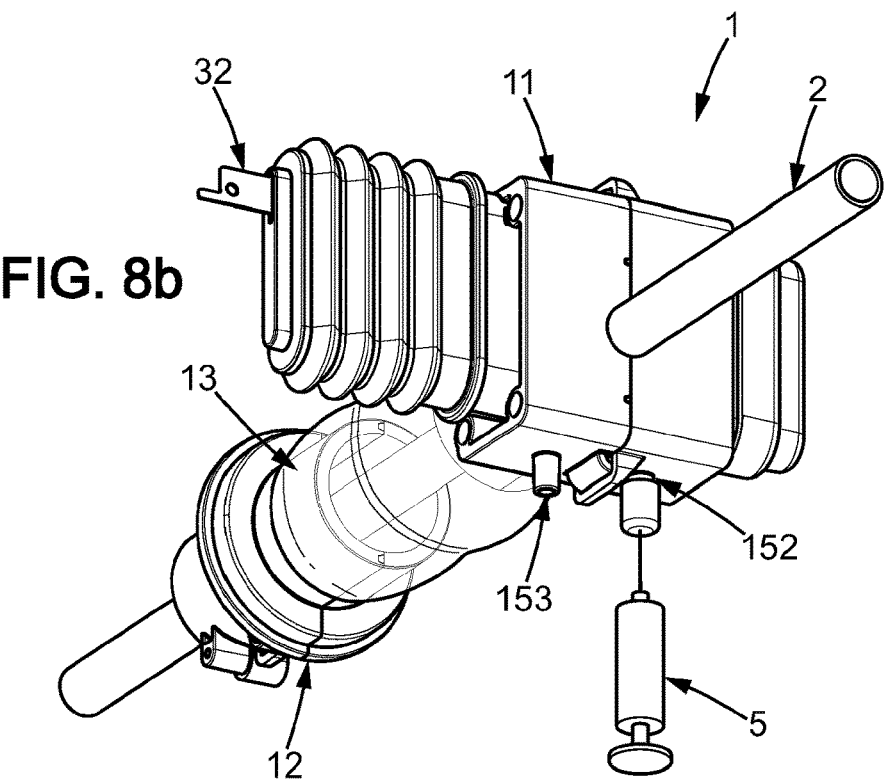

CONTAINMENT DEVICE FOR WORK CARRIED OUT ON A PIPE, AND ASSOCIATED METHOD

This application is a National Stage Application of International Application No. PCT/FR2014/052078 filed Aug. 11, 2014, which claims priority from French Patent Application No. 1357964 filed on Aug. 12, 2013, each of which are hereby incorporated by reference in their entirety.

The invention relates to the operations of cutting and isolating pipes that may contain a product that is hazardous to the environment or the personnel carrying out work.

To carry out work on a pipe 2 containing hazardous products or contaminants, it is common to use a containment device that, as shown in FIG. 1, has an enclosure 110 carried out by a film made from flexible plastic material, for example from vinyl. The seal is provided by adhesive tape 100. The plastic film has an orifice in order to allow access to the pipe 2 to be cut by a cutting tool 3. It has an orifice 112 for the collecting of effluents and possibly an orifice 113 for the venting of the enclosure 110 via a filter 6. According to another alternative, the cutting tool is entirely comprised within the envelope and the grasping of it is carried out by deformation of the flexible film.

This containment device is not convenient to implement. The preparation for the work to be carried out and the setting in place of the enclosure 110 are delicate and long (several hours) due to its flexibility. In practice, the film has to be installed in an airlock and by a team of several operators. The intervention itself, including the cutting of the pipe and the isolating of the sections of the pipe cut, also lasts several hours. The risk of leaks exists and in the case of a leak, the cleaning up has risks and again requires a substantial amount of time and generates additional waste. Furthermore, the vinyl wall constitutes a secondary waste that must be taken into account.

A purpose of this invention is to propose a new design for a containment device that reduces the incidence of the disadvantages hereinabove.

A containment device is as such proposed for intervention on a pipe. The device comprises a rigid tool flange that has an end wall provided with an orifice with a section adapted to the external cross section of the pipe, an opening wider than the orifice and located opposite the end wall, and a side access for a cutting tool. It further comprises a flexible film for forming a leaktight volume around the pipe, with a first end of the film fixed to the opening of the tool flange mounted on the pipe and a second end of the film connected to the pipe.

The containment device as such has a portion that has a certain mechanical resistance, facilitating the setting in place of the leaktight enclosure and the handling of the cutting tool. The risks of contact between the blade of the cutting tool and the flexible film are substantially reduced and even eliminated.

An embodiment of the containment device further comprises a second rigid flange for the connecting of the flexible film to the pipe. This second flange has an end wall provided with an orifice with a section adapted to the external cross section of the pipe, and an opening wider than the orifice of the second flange and located opposite the end wall of the second flange. The leaktight volume is then formed with the second end of the flexible film fixed to the opening of the second flange mounted on the pipe.

In this embodiment, it is no longer necessary to fix the flexible film directly onto the pipe. It is fixed on the enlarged openings of the two flanges which are simply mounted on the pipe, with their end walls axially delimiting the leaktight volume where the pipe will be opened at the time of cutting.

The flexible film can have, in a deployed state, a length greater than the distance along the pipe between the opening of the tool flange and the side access, increased by the distance between the respective openings of the tool flange and of the second flange mounted on the pipe. Once the pipe is cut, the two pieces whereon are mounted the two flanges can then be separated axially and seal the flexible film in order to close off the two pipe segments. A plug can then be added on the two flanges for the rest of the handlings.

A sealing element, such as a deformable bellows or a cable gland, can then be arranged on the side access of the tool flange in order to provide a seal around the cutting tool.

The tool flange can be designed so as to include at least one outlet in order to collect effluents and/or vent the leaktight volume.

According to another aspect of the invention, a method of cutting and of isolating a pipe is proposed, comprising:

mounting a rigid tool flange on the pipe, with the tool flange having an end wall provided with an orifice with a section adapted to the external cross section of the pipe, an opening wider than the orifice and located opposite the end wall, and a side access for a cutting tool;

setting in place a flexible film for forming a leaktight volume around the pipe, with a first end of the film fixed to the opening of the tool flange and a second end of the film connected to the pipe;

cutting the pipe using the cutting tool passing through the side access;

separating two segments of the pipe formed by the cutting; and sealing the ends of the two pipe segments.

In an embodiment of the method, the setting in place of the flexible film comprises:

mounting a second rigid flange on the pipe, with the second flange having an end wall provided with an orifice with a section adapted to the external cross section of the pipe, an opening wider than the orifice and located opposite the end wall, with the openings of the tool flange and of the second flange being placed facing one another; and fixing the flexible film on the openings of the tool flange and of the second flange.

In an embodiment, the separation of the two segments of the pipe formed by the cutting consists in axially separating the segments of the pipe until the end of the segment whereon the second flange is mounted exits from the opening of the tool flange. The sealing of the ends of the two pipe segments then consists in welding the flexible film onto itself in the interval between the opening of the tool flange and the end of the segment whereon the second flange is mounted. Plugs can then be placed on the openings of the two flanges each closed by a portion of the welded film.

In an embodiment that minimises the quantity of flexible film to be used, the tool flange and the second flange are mounted on the pipe with their respective openings placed against one another.

When the tool flange is arranged in two rigid shells with each one having a contact face with the other shell, the mounting of the tool flange on the pipe can comprise the depositing of glue on at least one of the contact faces of the two shells, the assembly and the clamping of the two shells on the pipe in such a way that the glue maintains the two shells together on the pipe by providing the closing of the leaktight volume, in particular around the pipe on the end wall of the tool flange.

The method can furthermore include, during and after the cutting of the pipe, a recovery of effluents via an outlet provided on the tool flange, and/or a venting of the leaktight volume via an outlet provided on the tool flange and provided with a filter.

Other characteristics and advantages of the invention shall appear in the description which is given of them hereinafter, for the purposes of information and in no way limiting, in reference to the annexed drawings, wherein:

FIGS. 8a and 8b show the collection of the effluents and the venting of the leaktight enclosure according to an embodiment of the method;

The containment device 1 according to the invention is intended to allow for the cutting and the isolating of a pipe 2 in a leaktight handling. To this end, the containment device 1 is to be fixed around a pipe 2 in order to form a substantially leaktight enclosure around a section of this pipe where the cutting will take place.

Figure 7:
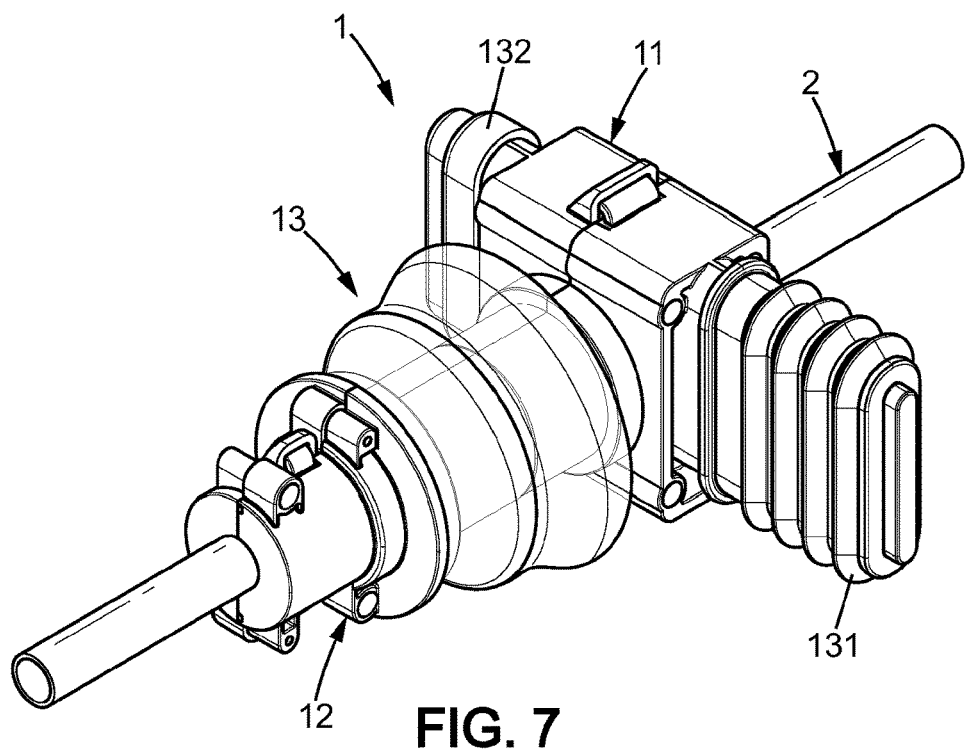
FIG. 7 shows the fastening to the two flanges of a cuff formed from a film of flexible plastic material.
Figure 9:
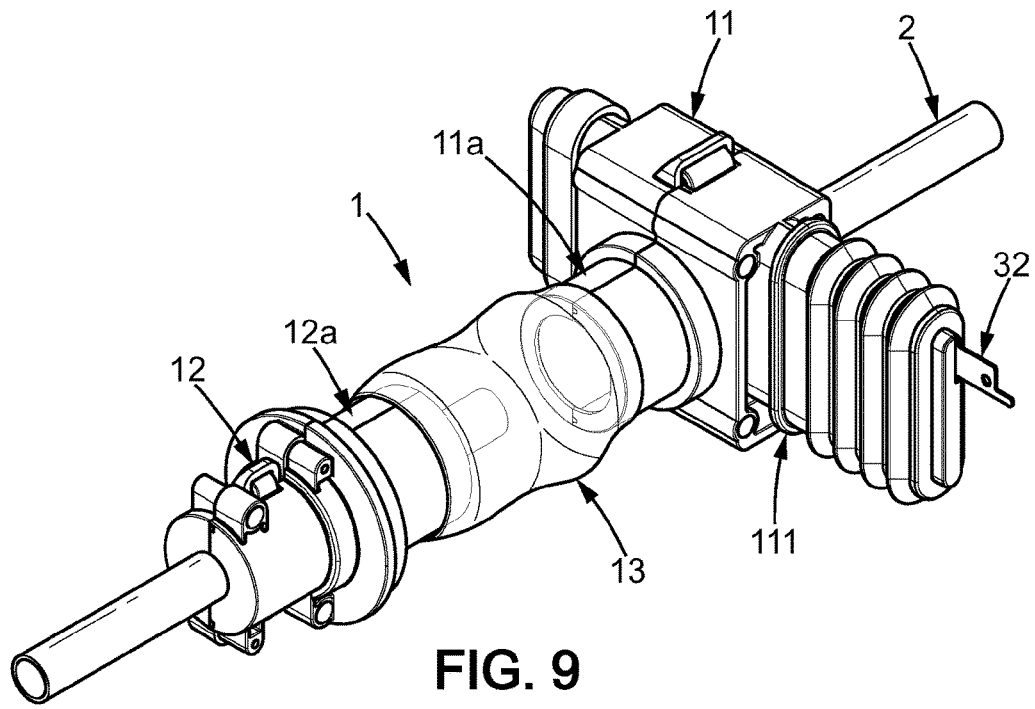
FIG. 9 shows a first stage of the isolating of the pipe cut according to an embodiment of the method.

An example of this containment device 1, assembled on a pipe can be seen in FIGS. 7-9. It is comprised of a first rigid flange 11, called here tool flange (FIGS. 2 and 4), a second rigid flange 12 (FIGS. 3 and 5), and a film made of flexible plastic material 13 in the shape of a cuff.

Figure 1:
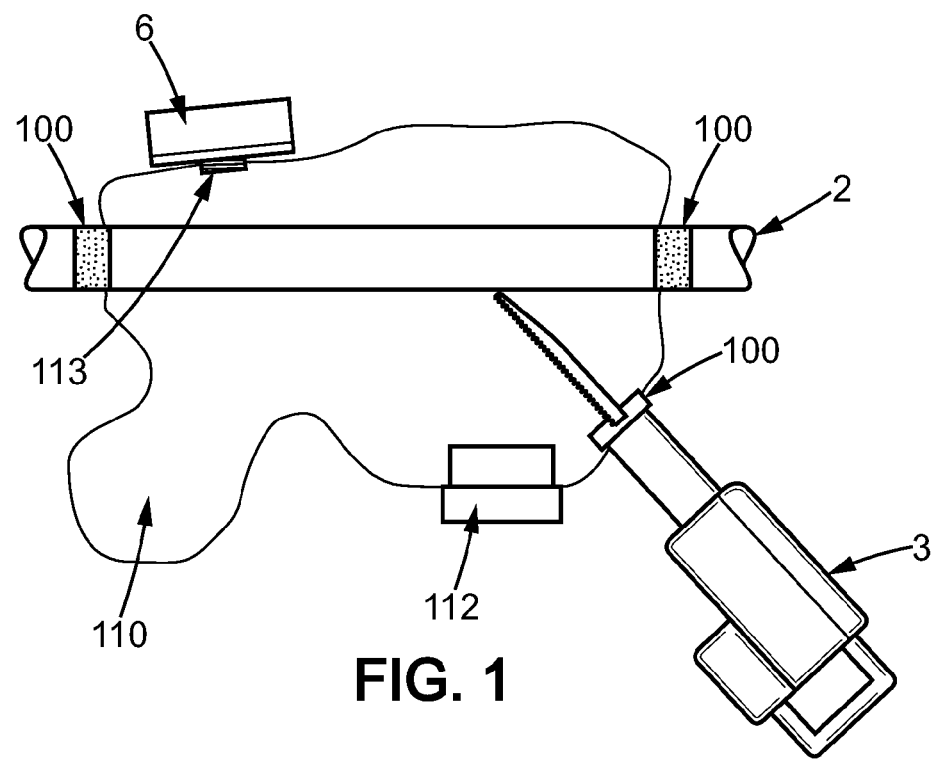
FIG. 1 shows a containment device used in prior art.
Figure 2A:
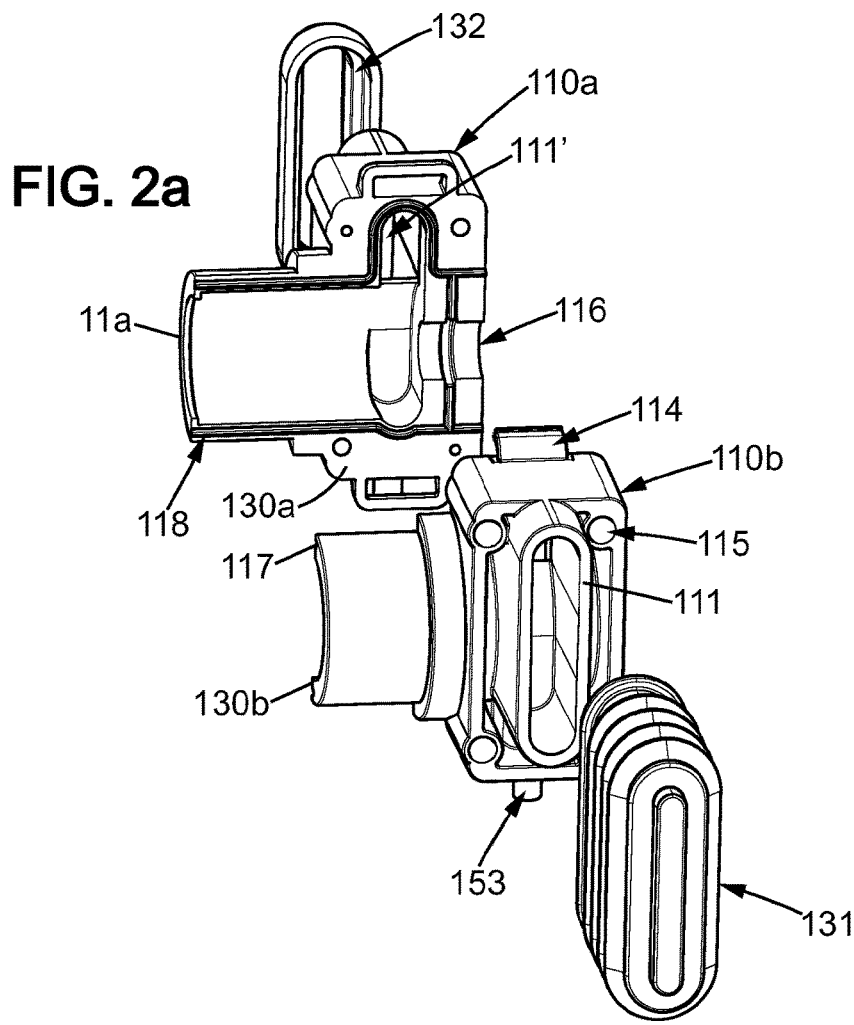
FIGS. 2a and 2b are exploded and assembled views of a tool flange according to a first aspect of the invention.
Figure 2B:
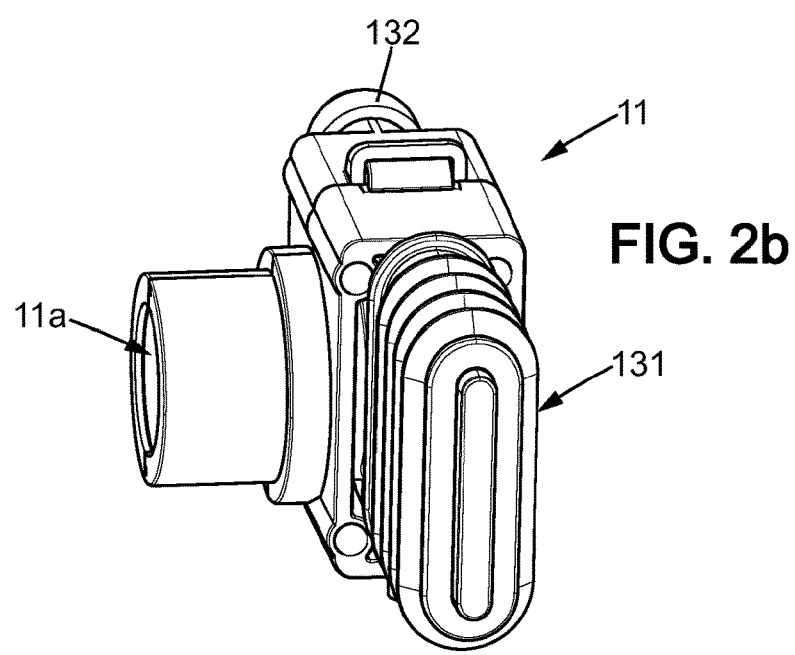
Figure 3A:
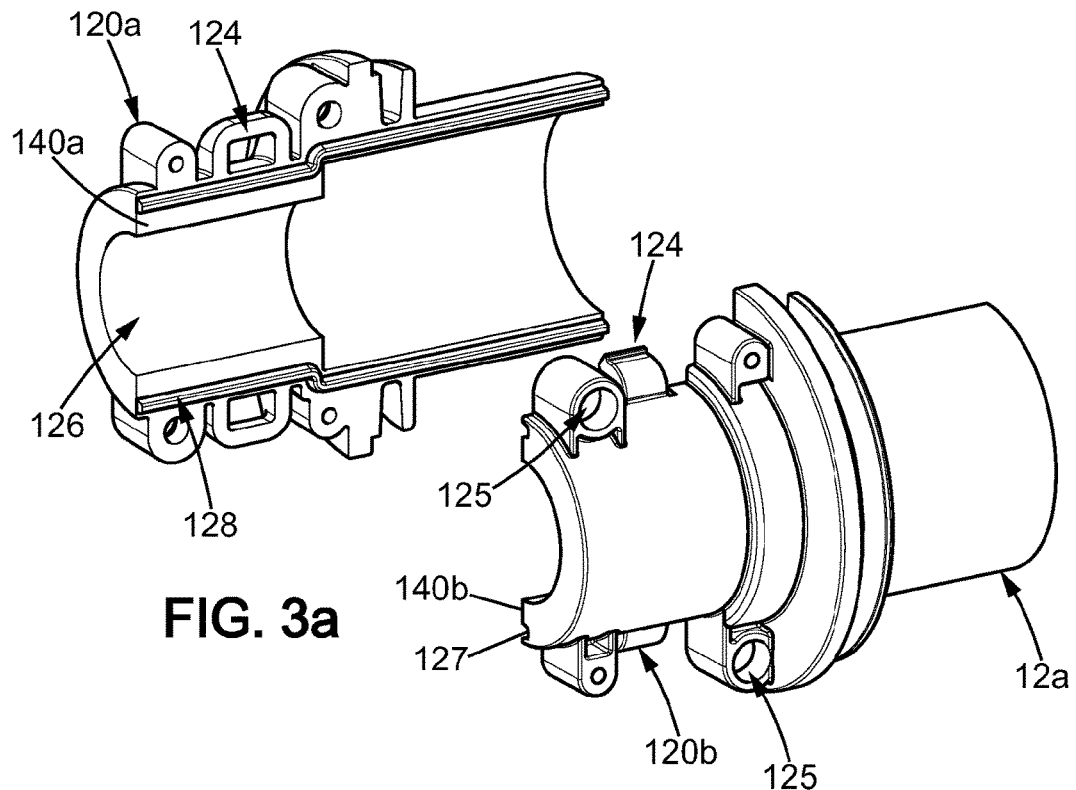
FIGS. 3a and 3b are exploded and assembled views of a second flange according to an embodiment of the containment device.
Figure 3B:
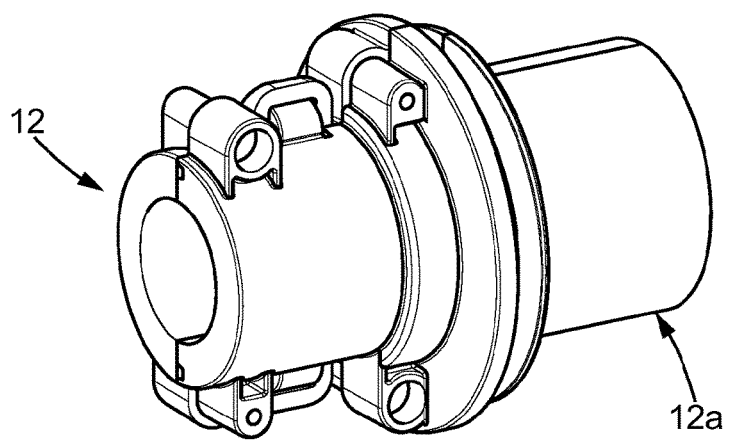

As shown in FIGS. 2a and 3a, each flange comprises an end wall 116, 126 which has an orifice in the shape of and dimensions adapted to the shape and to the dimensions of the pipe 2. A seal can possibly be arranged to contribute to this adaptation in the shape and dimensions as well as to the seal of the enclosure.

The flanges 11, 12 shown in FIGS. 2 to 5 each comprise two shells 110a-b and 120a-b, respectively, intended to be assembled together around a cross section of pipe.

The two shells 110a-b, 120a-b of a flange 11, 12 each comprise a contact face 130a-b, 140a-b, with the two contact faces of a flange placed one against- the other when the flange is assembled on the pipe 2.

The assembly of each flange 11, 12 can be temporarily be provided by temporary retaining brackets 114, 124. Passages 115, 125 for the screws are furthermore provided in order to clamp together the two shells of each flange. To this effect, from two to four tightening screws corresponding to as many passages 115, 125 per flange can be provided.

In order to ensure an accurate positioning between the two shells 110a-b, 120a-b of a flange 11, 12 on the pipe 2, a rib 118, 128 can be formed on the contact face 130a, 140a of one of the two shells 110a, 120a of the flange in order to cooperate with a complementary groove 117, 127 formed on the contact face 130b, 140b of the other shell 110b, 120b of the flange.

Before assembling the two shells 110a-b, 120a-b of a flange 11, 12 on the pipe 2, glue is placed on at least one of the contact faces 130a-b, 140a-b of these two shells. Then the two shells are brought together on the pipe 2 (FIGS. 2b and 3b) by holding them using brackets 124, and the whole is clamped using screws inserted into the passages 115, 125.

Once the glue has set, the assembly is made integral and rendered leaktight by the layer of glue between the two shells 110a-b, 120a-b and, on the orifice of the end wall 116, 126, between each shell and the pipe 2.

Opposite its end wall 116, 126, each flange 11, 12 comprises an opening 11a, 12a wider than the pipe 2, and therefore wider than the orifices formed in the end walls 116, 126.

The tool flange 11 is distinguished from the second flange 12 in that it comprises a side access 111 for a cutting tool. This side access 111 opens into a chamber delimited by the tool flange 11. This chamber comprises at least one wall that extends at a distance from a longitudinal portion of the pipe 2 in order to delimit a space around this longitudinal portion of the pipe 2, with this space being open on the side of the opening 11a of the flange 11. In the example shown in the figures, said at least one wall is a cylindrical wall of inner diameter greater than the outer diameter of the pipe 2 and of the same axis of symmetry. The invention is in no way limited to the example shown in the figures, and in particular any shape of chamber, for example a chamber with four walls of parallelepiped shape, and a certain excentricity of the pipe in relation to the chamber can be considered.

The materials used for the manufacture of the flanges 11, 12 are chosen to resist the possible chemical attacks of the hazardous product or products contained in the pipe, in particular acids (nitric acid, etc.) and solvents (for examples TPH, TBP and its degradation products).

Such as shown for example in FIG. 8a, the film 13 made of flexible plastic material, for example from vinyl, completes the seal of the volume formed between the flanges 11, 12 around the pipe 2.

Figure 6:
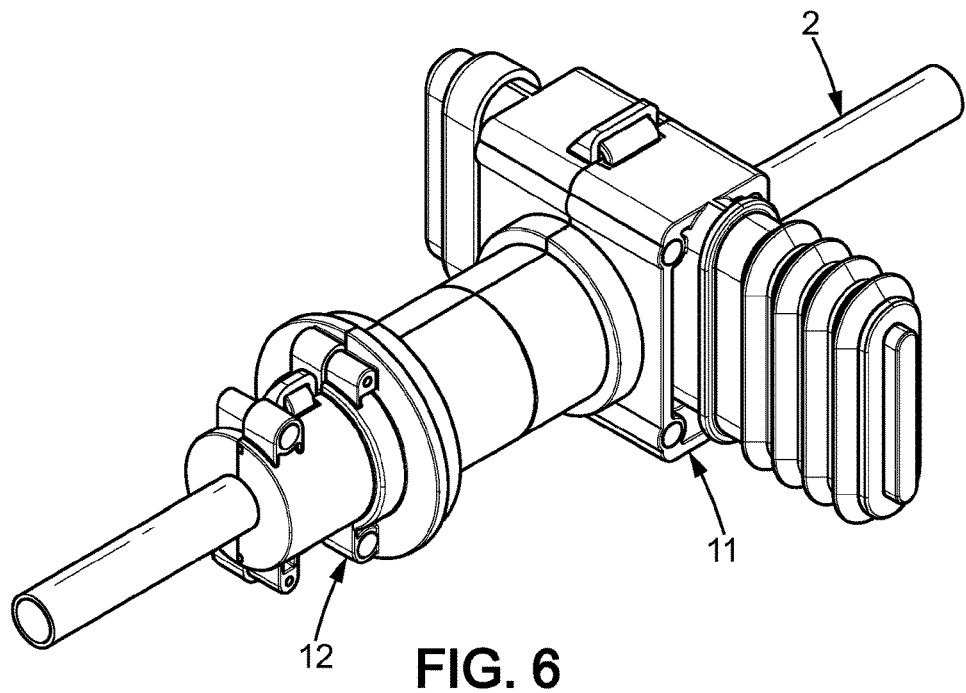
FIG. 6 shows a preferred relative position of the two flanges mounted on the pipe before proceeding with the cutting.

During the mounting of the flanges 11, 12 on the pipe 2, their respective openings are placed facing one another as shown in FIG. 6. The film 13 has one end fixed to the opening 11a of the tool flange 11 mounted on the pipe and an opposite end fixed to the opening 12a of the second flange 12 also mounted on the pipe.

When it is set into place, the plastic film 13 is for example fixed using adhesive tape on cylindrical portions of the flanges 11, 12 terminating with the openings 11a, 12a. It is on the other hand glued onto itself parallel to the pipe, also using adhesive tape, in order to have the shape of a cuff that closes the leaktight volume between the flanges 11, 12 (FIGS. 7-9).

As shown in FIGS. 6 and 7, it is advantageous (although not required) that the flanges 11, 12 be mounted on the pipe 2 with their respective openings 11a, 12a in contact with one another.

The cuff formed by the flexible film 13 is then compressed onto itself in the manner of a bellows as shown in FIG. 7.

Then, after cutting of the pipe 2, the two pipe segments that were separated are axially separated from each other by deploying the cuff that was compressed beforehand. The film 13 deployed as such can be seen in FIGS. 8 and 9.

The placing and the fastening of the flanges 11, 12 and of the film 13 can advantageously be carried out by a single operator, where applicable provided with universal equipment, without necessarily having to install a confinement airlock.

The access to the pipe 2 by the cutting tool is guided by the side access 111. The latter consists of an access orifice adapted to the cutting tool and provided with a sealing element 131. In the case where the cutting tool uses a blade of flattened shape 32 with a longitudinal back-and-forth movement (FIGS. 8-10), the access 111 has the form of an oblong orifice in order to guide the blade in a plane perpendicular to the pipe 2. The guiding allows for secure handling, in particular by minimising the risks of accidentally piercing the flexible film 13.

The sealing element 131 arranged on the side access 111 of the flange 11 has for example the shape of a sealing bellows. The bellows is for example made of PVC and its fastening is provided using an adhesive.

Figure 11A:
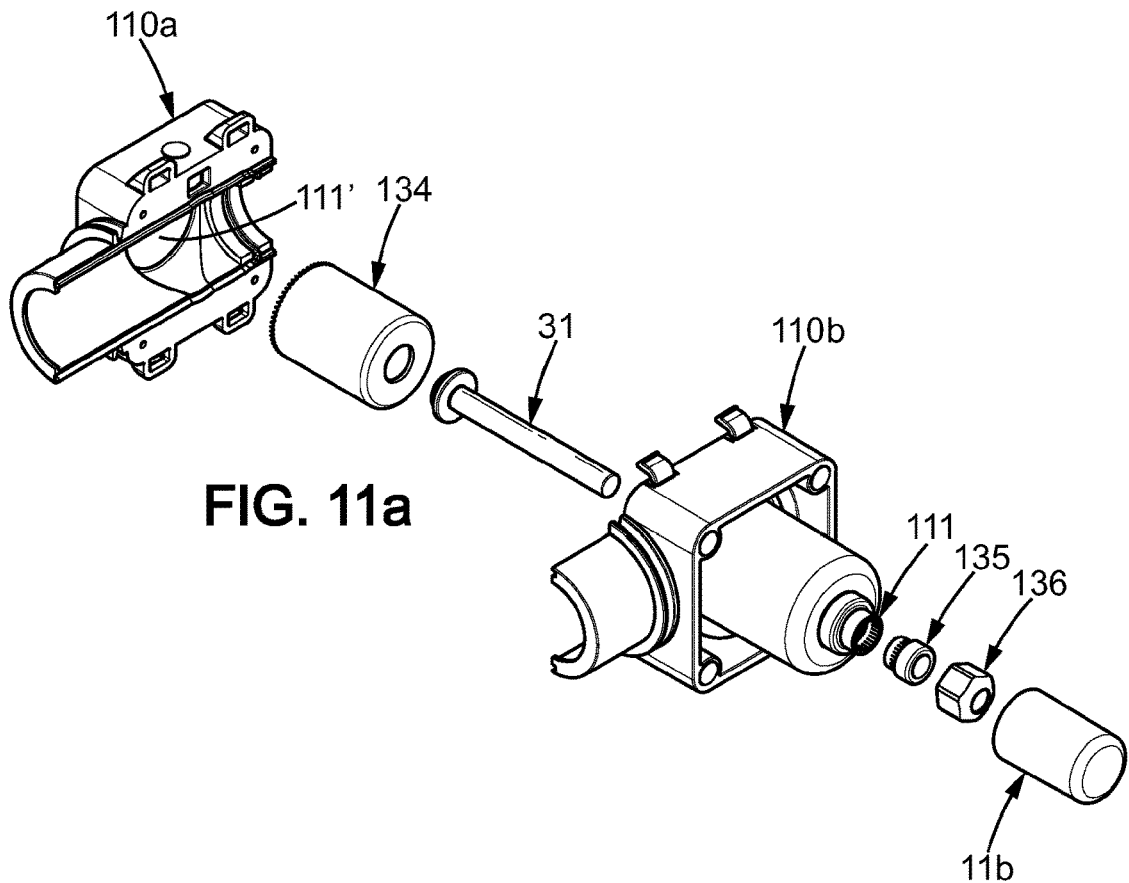
FIGS. 11a and 11b are exploded and assembled views of an alternative flange that can be used according to the invention.
Figure 11B:
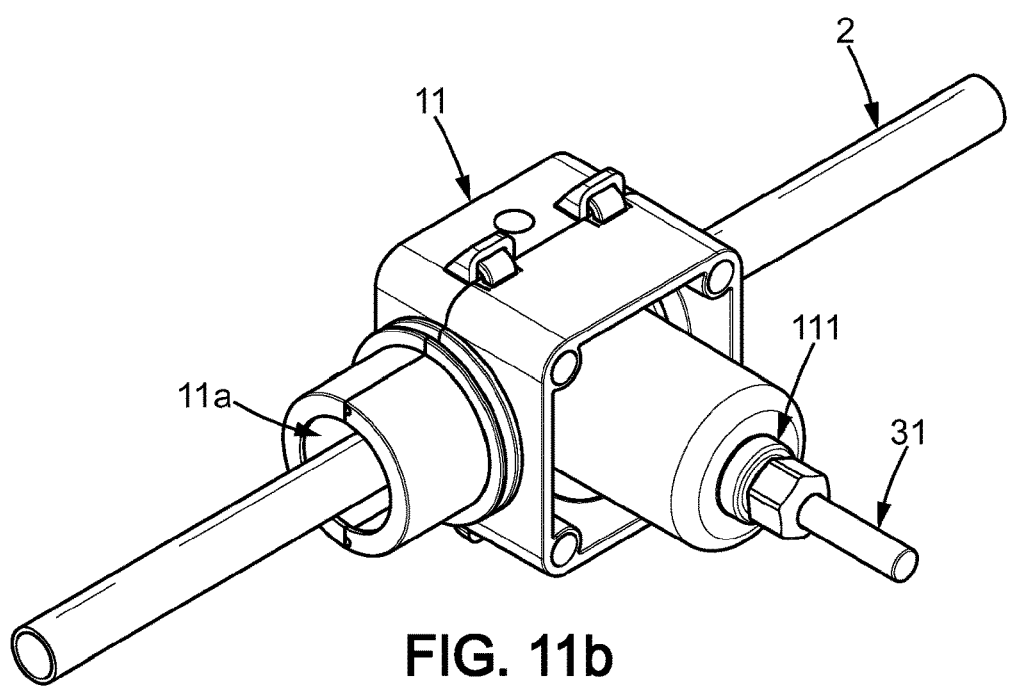

FIGS. 11a-b show a second example wherein the cutting tool is a bell saw. In this case, the sealing element can be a cable gland 135 mounted on the tool flange 11. According to this second example, a transmission shaft 31 passes through the cable gland 135 in order to drive in rotation the cylindrical blade 134 of the bell saw located in a housing delimited by the outer envelope of the half-shell 110b and forming a side extension of the chamber formed in the tool flange 11. The cable gland can be clamped using a nut 136 placing into engagement the end of the transmission shaft 31. The blade 134 will remain in the flange 11 after disconnection between the shaft 31 and the drive motor of the blade 134, in order to constitute a waste with the flange 11 and the pipe segment 2 whereon it is glued. The fact that the cut is rounded and that a piece of pipe remained housed in the bell saw blade 134 or the flange 11 does not constitute a disadvantage in the case of discarding cut pipe segments.

Figure 4A:
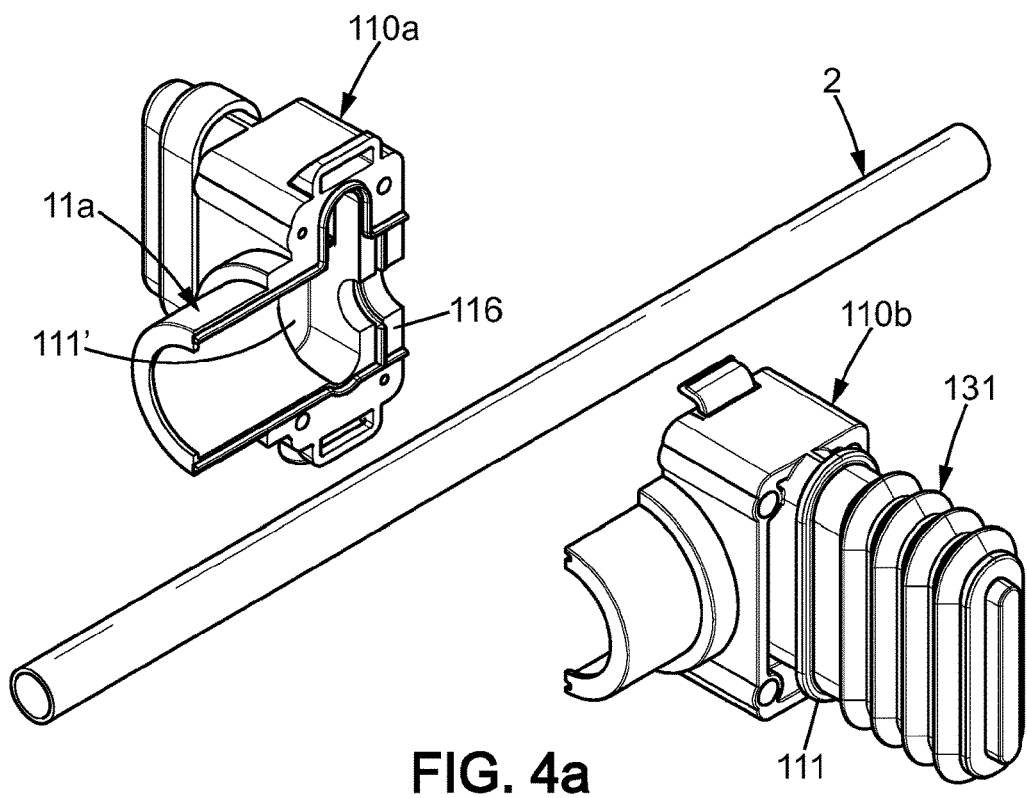
FIGS. 4a and 4b show the fastening of a tool flange on a pipe.
Figure 4B:
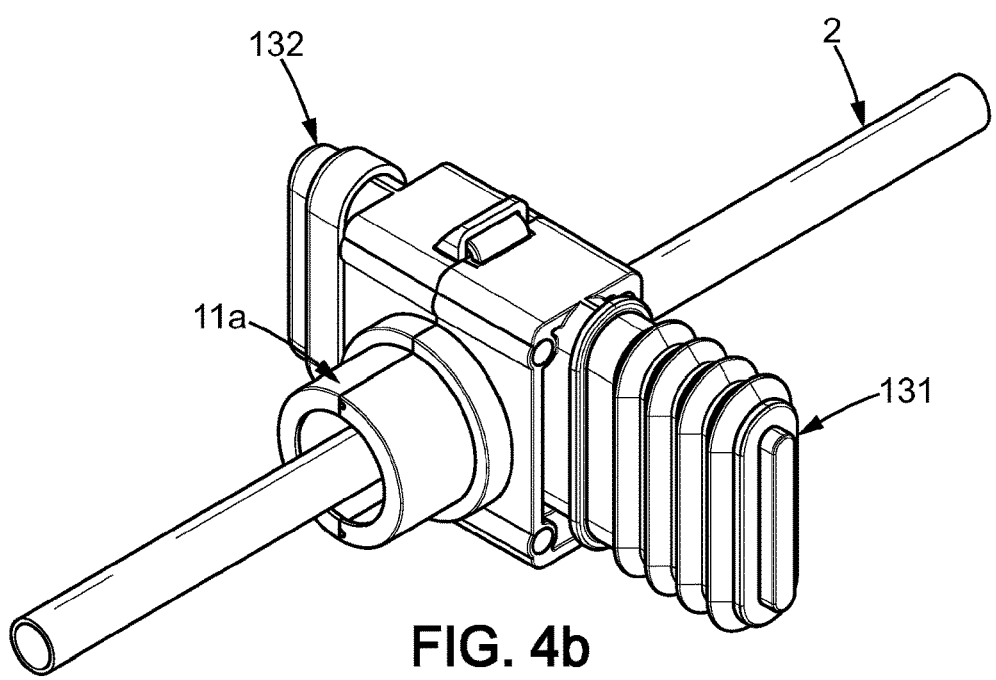
Figure 5A:
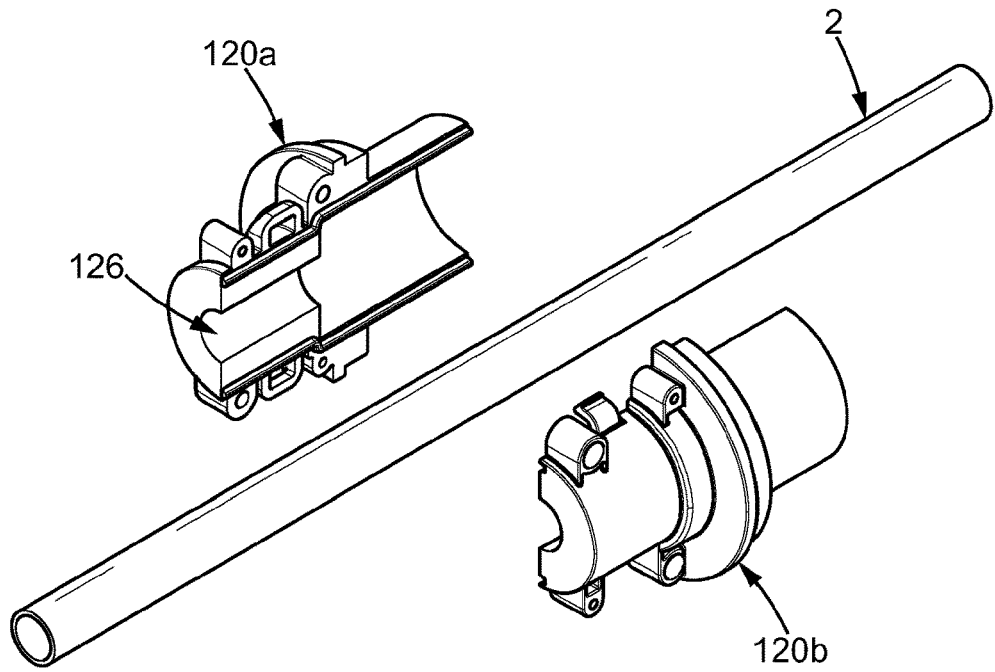
FIGS. 5a and 5b show the fastening of a second flange on the pipe.
Figure 5B:
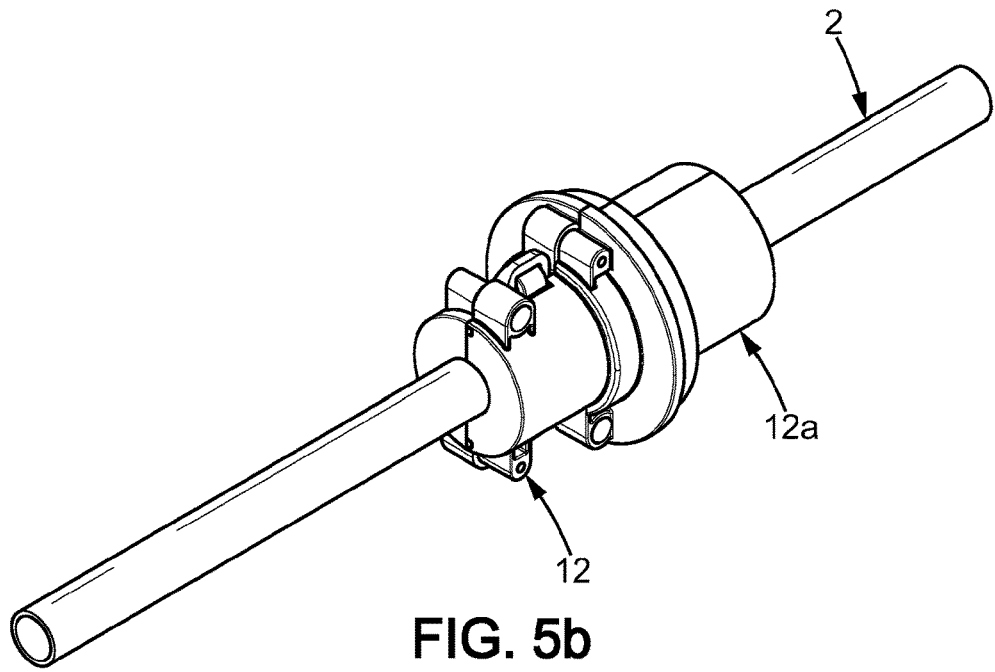

An interesting option is to provide the tool flange 11 with two diametrically opposite side accesses, marked by the references 111 and 111' in the FIGS. 2a, 4a and 11a. Once of these two accesses will be, in service, hermetically closed by a plug 132, while the other will receive the sealing element 131 or 135 and the blade 32, 134 of the cutting tool. This arrangement allows for a choice between a cutting via the left side and a cutting via the right side according to which is the most convenient for the operator in light of the outside elements that can interfere with handling. Possibly, more than two side accesses can be distributed angularly on the tool flange 11 around the axis of the pipe 2.

As shown in FIGS. 8a and 8b, the tool flange 11 can furthermore include an orifice 152 for collecting effluents. A pipette 4 (three-way valve) or a syringe 5 can then be connected to the collection orifice 152. The collection orifice 152 is preferentially arranged to be located in the lower portion on the tool flange 11 when the latter is fixed to the pipe 2.

As shown in FIGS. 2a, 8a and 8b, the flange 11 can furthermore include a venting orifice 153 that can receive a filter (not shown).

A valve can be placed on each orifice 152, 153 in order to control the collection of the effluents and the venting.

As can be understood when viewing FIGS. 7 to 9, the length of the cuff comprised of the film 13 is more preferably greater, for example by about ten centimetres, than the distance between the opening 11a of the tool flange 11 and the longitudinal position of the side access 111, when the two openings 11a, 12a of the flanges 11, 12 are placed into contact when they are fastened. The minimum length of film 13 must be increased by the longitudinal distance between the openings 11a, 12a of the flanges 11, 12, if the latter are fixed to the pipe 2 with an interval between them.

After having cut the pipe and axially separated the two pipe segments that result by deploying the plastic film 13 (FIG. 9), and after having recovered the effluents and/or vented the leaktight volume, a sealing tool is inserted into the interval between the two pipe segments in order to weld the plastic film 13 onto itself. The weld of the film 13 is carried out substantially perpendicularly to the pipe and can consist in a relatively extended weld over a longitudinal portion of the film or in two weld lines separated from each other by a longitudinal portion of the film.

The weld of the film 13 isolates the two segments that were cut. The film 13 is then cut perpendicularly to the pipe, either between the two weld lines, or along the extended weld, taking care to the leave the weld hermetically sealed on each side.

Figure 10:
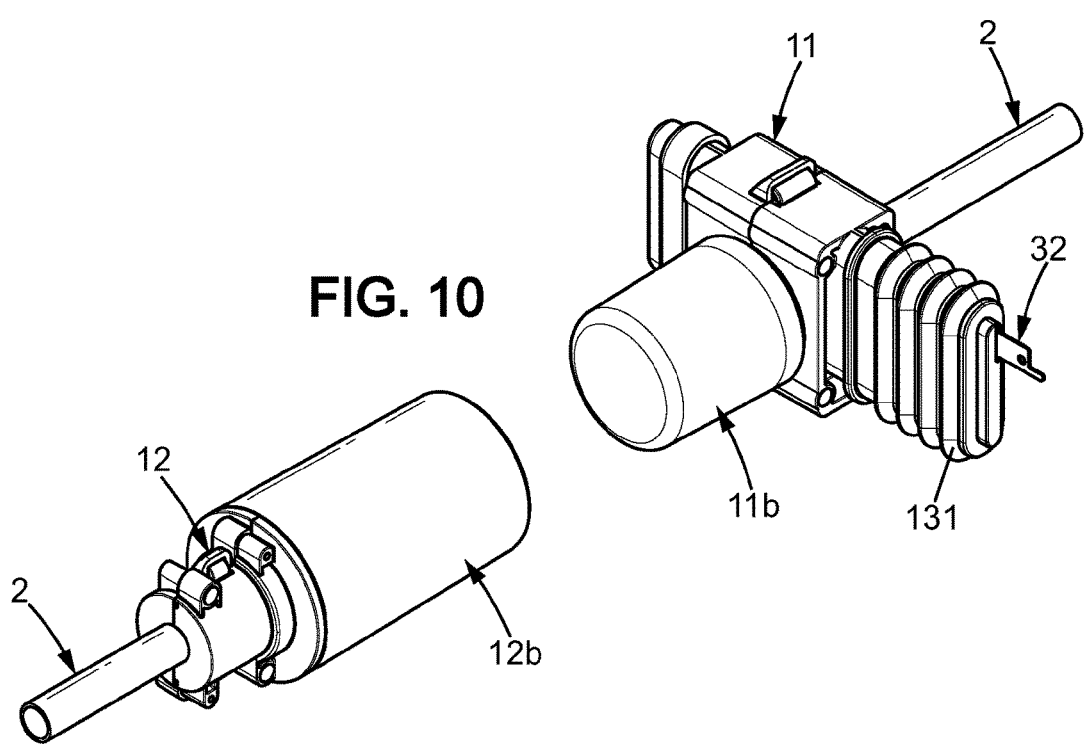
FIG. 10 shows a second stage of the isolating of the pipe.

In order to protect the openings 11a, 12a of the flanges closed by the two welded portions of the film 13, plugs 11b, 12b are then placed on these openings (FIG. 10). The seal of the whole can furthermore be provided by the gluing of the plugs.

Note that the quantity of vinyl (or other plastic) to be used to seal the two flanges using a flexible film can remain limited. It is sufficient to have the space, once the film is deployed, to separate the pipe segments cut, to pinch the film onto itself and to carry out a weld that is sufficiently wide so that it can then be cut.

The invention is in no way limited to the embodiments presented hereinabove as an illustration. Various alternatives are possible. One of them, for example, consists in providing a rigid flange only on the side of the cutting tool, with the vinyl film being glued directly onto the pipe with adhesive tape on the other side of the leaktight volume.

The invention claimed is:

1. A confinement device for working on a pipe, the device comprising:
   a rigid tool flange having an end wall provided with an orifice with a section adapted to an external cross section of the pipe, an opening wider than the orifice and located opposite the end wall, and a side access for a cutting tool;
   a second flange having an end wall provided with an orifice with a section adapted to the external cross section of the pipe, and an opening wider than the orifice of the second flange and located opposite the end wall of the second flange; and
   a flexible film for forming a leaktight volume around the pipe, the flexible film having a first end fixed to the opening of the tool flange mounted on the pipe and a second end of the film fixed to the opening of the second flange mounted on the pipe,
   wherein the flexible film has, in a deployed state, a length greater than a distance along the pipe between the opening of the tool flange and the side access, increased by the distance between the respective openings of the tool flange and of the second flange mounted on the pipe.

2. The confinement device as claimed in claim 1, further comprising:
   a sealing element arranged on the side access of the tool flange in order to provide a seal around the cutting tool.

3. The confinement device as claimed in claim 1, wherein the tool flange comprises at least one outlet in order to collect effluents and/or vent the leaktight volume.

4. A method for cutting and isolating a pipe, the method comprising:

mounting a rigid tool flange on the pipe, the tool flange having an end wall provided with an orifice with a section adapted to an external cross section of the pipe, an opening wider than the orifice located opposite the end wall, and a side access for a cutting tool;

mounting a second flange on the pipe, the second flange having an end wall provided with an orifice with a section adapted to the external cross section of the pipe, and an opening wider than the orifice of the second flange and located opposite the end wall of the second flange;

fixing a flexible film on the openings of the tool flange and of the second flange for forming a leaktight volume around the pipe, wherein the flexible film has, in a deployed state, a length greater than a distance along the pipe between the opening of the tool flange and the side access, increased by the distance between the respective openings of the tool flange and of the second flange mounted on the pipe;

cutting the pipe using the cutting tool passing through the side access;

separating two segments of the pipe formed by the cutting; and sealing the ends of the two pipe segments.

5. The method according to claim 4, wherein separating the two segments of the pipe formed by the cutting comprises axially separating the segments of the pipe until the end of the segment whereon the second flange is mounted exits from the opening of the tool flange, and wherein sealing of the ends of the two pipe segments comprises welding the flexible film onto itself in the interval between the opening of the tool flange and the end of the segment whereon the second flange is mounted.

6. The method according to claim 5, wherein plugs are respectively placed on the openings of the two flanges each closed by a portion of the welded film.

7. The method according to claim 4, wherein the tool flange and the second flange are mounted on the pipe with the respective openings placed against one another.

8. The method according to claim 4, wherein the tool flange comprises two rigid shells each having a contact face with the other shell, and wherein the mounting of the tool flange on the pipe comprises:

depositing glue on at least one of the contact faces of the two shells; and assembling and clamping the two shells onto the pipe in such a way that the glue maintains the two shells together on the pipe by providing the closing of the leaktight volume, in particular around the pipe on the end wall of the tool flange.

9. The method according to claim 4, further comprising, during and after the cutting of the pipe, a recovery of effluents via an outlet provided on the tool flange.

10. The method according to claim 4, further comprising, during and after the cutting of the pipe, a venting of the leaktight volume via an outlet provided on the tool flange and provided with a filter.

* * * * *